Oct. 10, 1961 C. E. QUISENBERRY 3,003,306
SPROCKET CHAIN SEPARATOR WITH MEANS FOR MEASURING
THE DESIRED LENGTH OF CHAIN
Filed Dec. 10, 1957 4 Sheets-Sheet 1

INVENTOR.
CARTER QUISENBERRY
BY
ATTORNEY

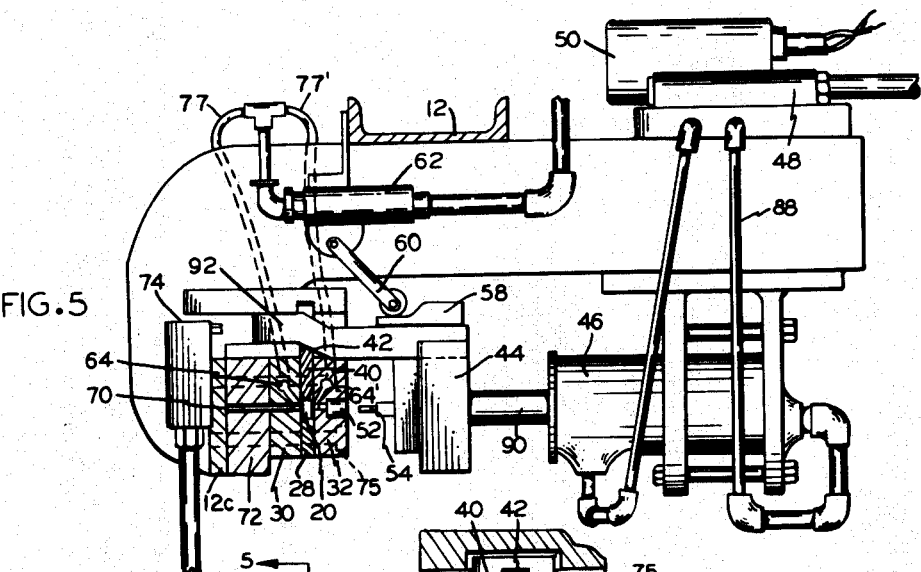
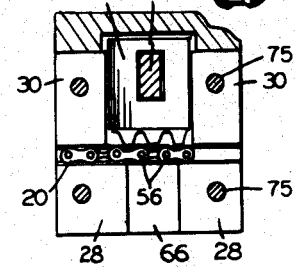
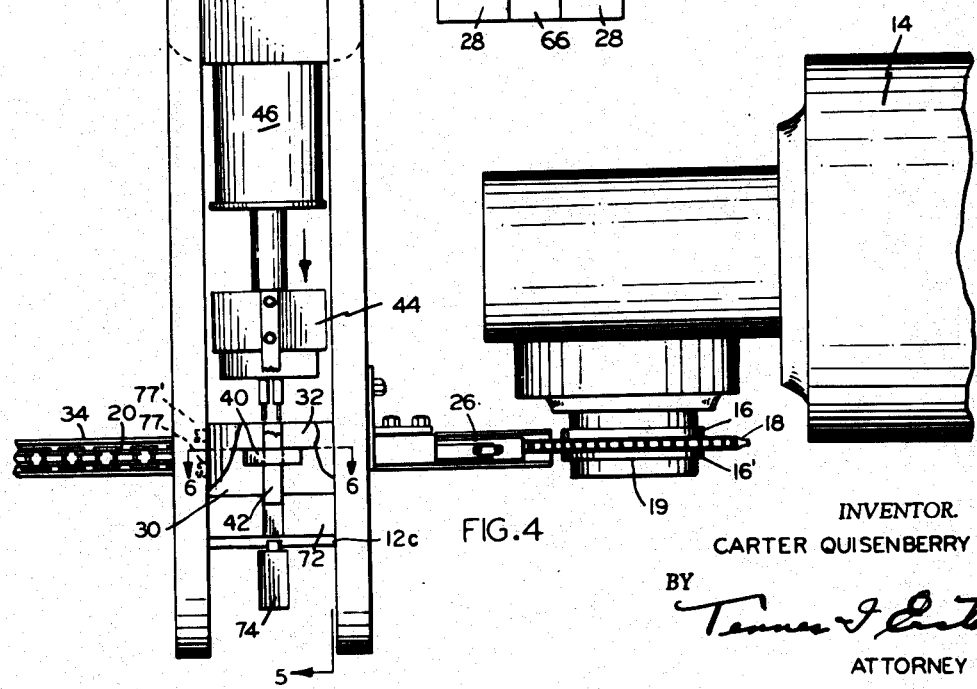

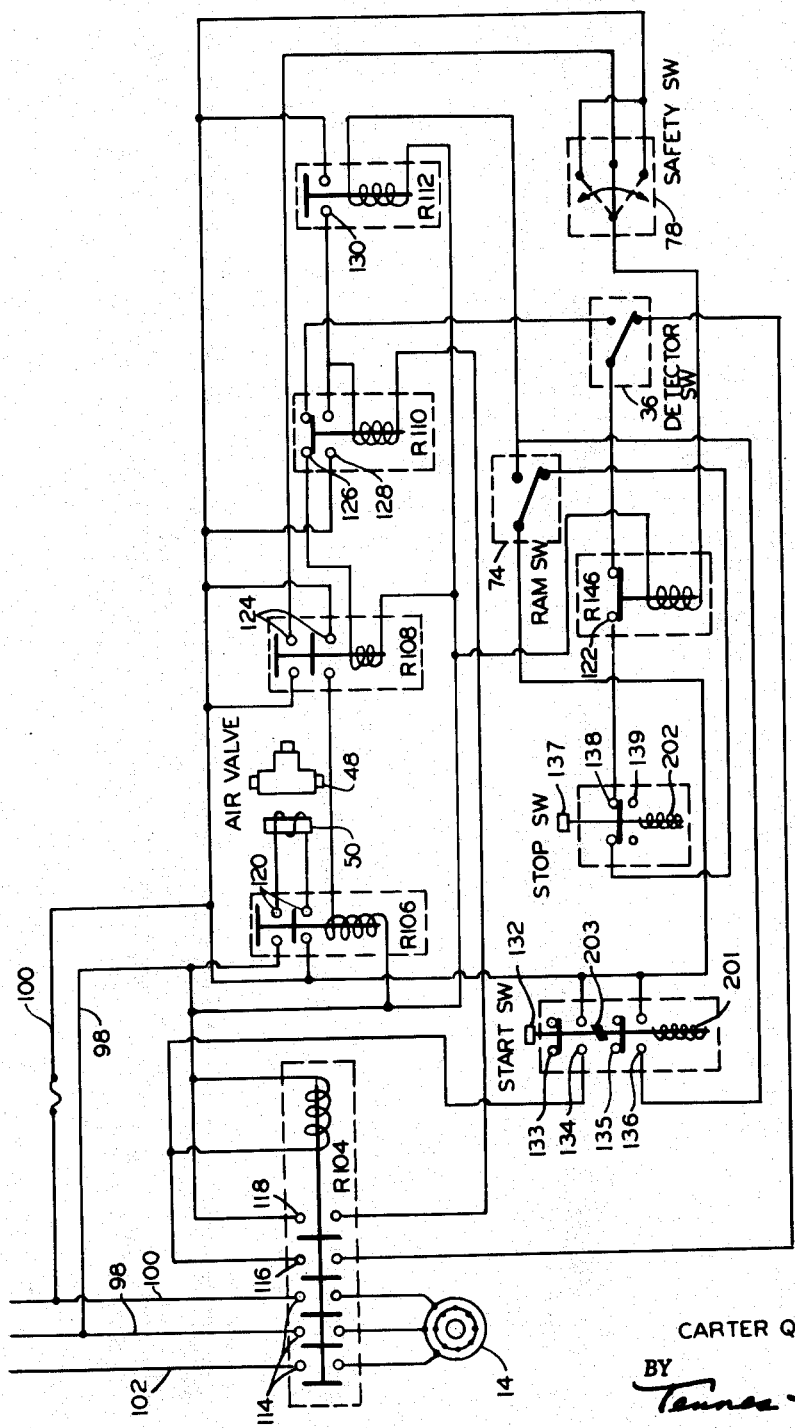

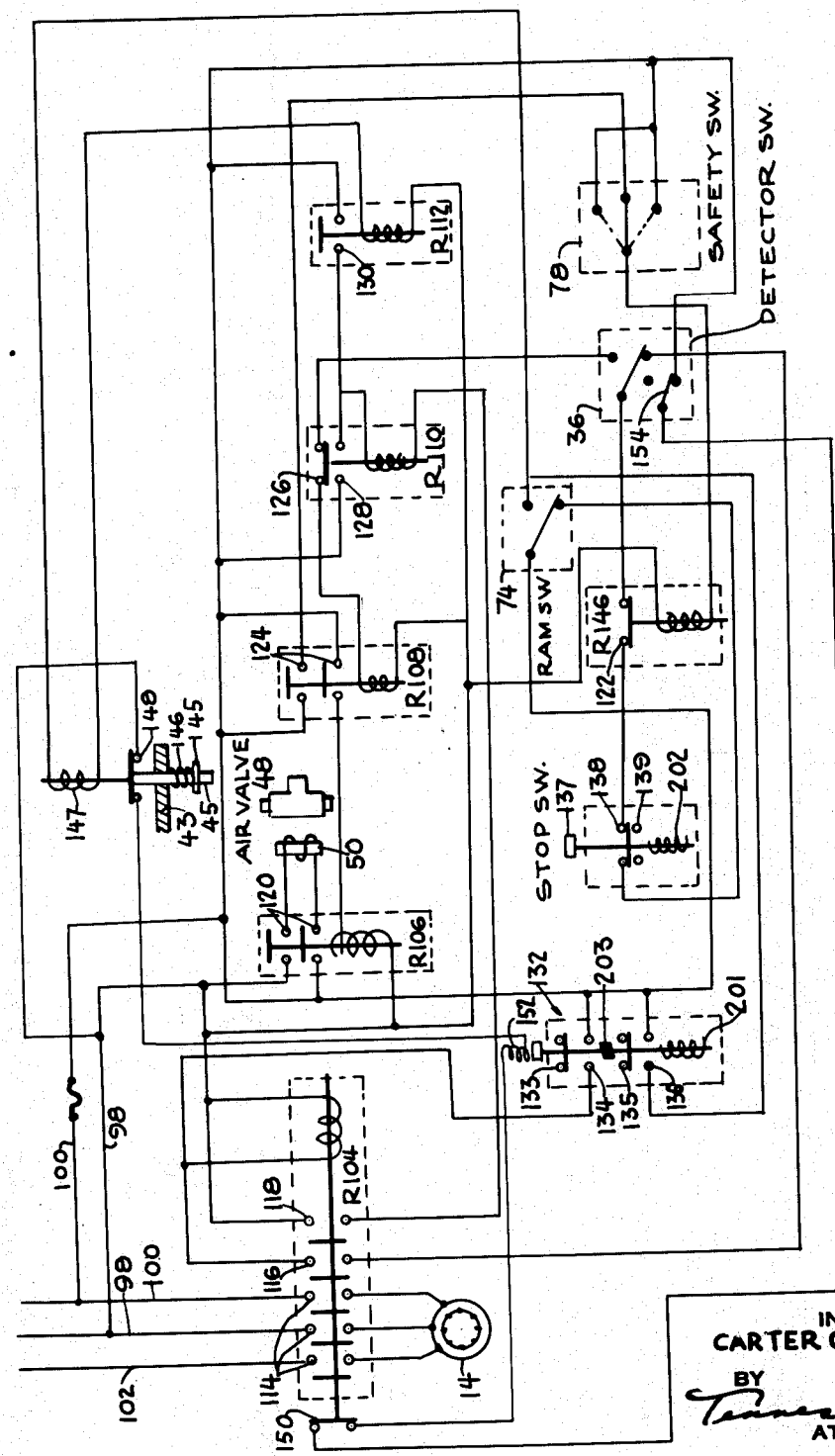

United States Patent Office 3,003,306
Patented Oct. 10, 1961

3,003,306
SPROCKET CHAIN SEPARATOR WITH MEANS FOR MEASURING THE DESIRED LENGTH OF CHAIN
Carter E. Quisenberry, Kirkwood, N.Y., assignor to American Machine & Foundry Company, a corporation of New York
Filed Dec. 10, 1957, Ser. No. 701,761
21 Claims. (Cl. 59—7)

This invention relates to a method for separating measured lengths of roller chain from a stock roll of roller chain, and has for its primary object to automatically and mechanically measure a predetermined length of roller chain and to separate the length from the supply roll.

Another object is to automatically remove both connecting pins of one link and to discharge the extracted pins and chain links from the machine.

Still another object is to eliminate the need for manual control, measurement or manipulation of the chain during the process of separation.

Another object is to provide for the adjustment of the machine to produce any one of a wide variety of chain lengths.

These objects and others may be attained by the employment of this invention, which embodies such features as the automatic delivery of roller chain from a supply roll and the metering thereof and the automatic removal of connecting pins and links, thereby separating the metered length of chain from the supply.

Other features include the removal of the extracted pins and links from the machine by an air blast and the automatic sensing and control of chain length, position and provisions for stopping operation in the event of malfunction of the roller chain.

Other objects and features of the invention will appear as the description of the particular physical embodiment selected to illustrate the invention progresses. In the accompanying drawings which form a part of this specification like characters of reference have been applied to corresponding parts throughout the several views which make up the drawings.

FIGURE 4 is a plan view of the invention taken substantially along the line 4—4 of FIGURE 1.

FIGURE 5 is a vertical sectional view taken substantially along the line 5—5 of FIGURE 4.

FIGURE 6 is a transverse sectional view taken substantially along the line 6—6 of FIGURE 4.

FIGURE 7 is a wiring diagram illustrating the electrical controls embodied in this invention.

FIG. 9 is a schematic diagram showing details of the withdrawal of pin 45 and an operating circuit for the start switch 132 shown in FIG. 7.

Figure 1:
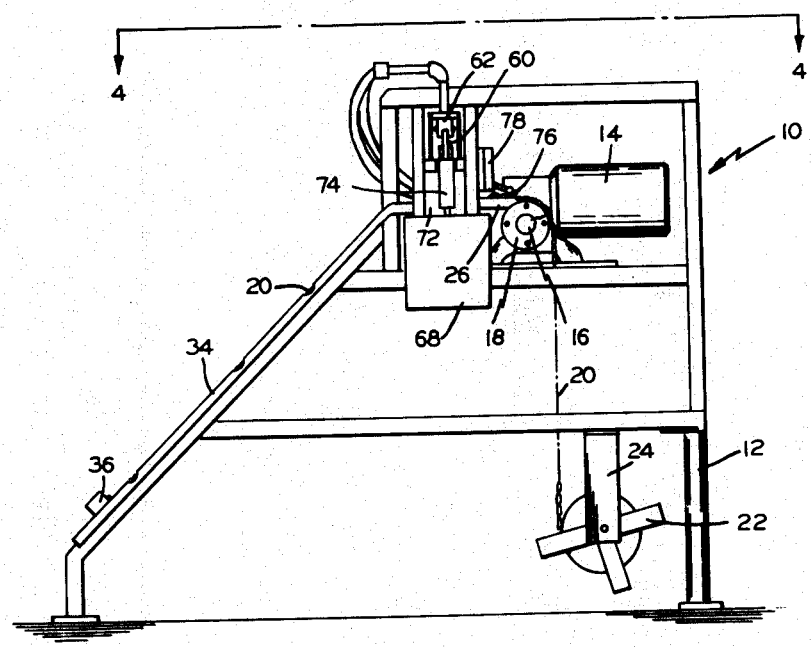
FIGURE 1 shows a side view of a machine embodying the features of this invention.
Figure 2:
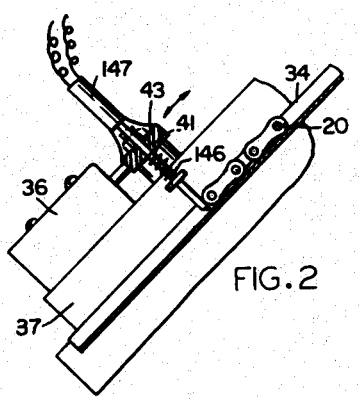
FIGURE 2 is an enlarged view of a segment of FIG. 1.
Figure 3:
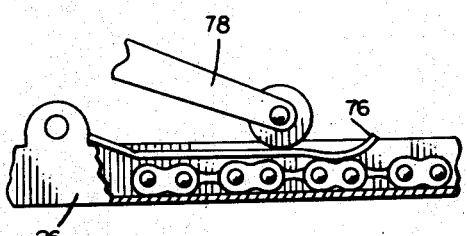
FIGURE 3 is an enlarged view of a segment of FIG. 1.

Referring to the drawings in detail, my chain separating machine 10 generally designated comprises a channel iron and tubular constructed frame 12 which supports and contains an electrically operated, integrally braked geared head motor 14 which drives through a slip clutch, sprocket 18 to deliver roller chain 20 from a reel 22 supported on bracket 24 through the machine 10. The slip clutch consists of a pair of friction discs 16, 16', one on each side of sprocket 18. A nut 19 engages the threaded end portion of the hub on which friction discs 16, 16' and sprocket 18 are mounted. Friction between the friction discs 16, 16' and sprocket 18 is adjustable by tightening or loosening nut 19. The roller chain 20 passes over the sprocket 18 and thence to the guide channel 26 and over the guide block 28 and between guide plate 30 and punch guide 32 and from thence out of the chain separating mechanism and into the metering channel 34. If desired the sides of the channel 34 may be bent inwardly to so enclose the roller chain that it could not double upon itself if the angle of the metering channel 34 is too shallow. In this case suitable open areas may be located on the metering channel 34 as in the case of the semi-circular slots 94, to allow the operator to remove the separated length of chain. Transversely affixed to the frame part 12a and adjacent to the metering channel 34 is movably mounted a conventional detecting electric switch mechanism 36 which may employ a switch of the type known as "Microswitch." This switch 36a is actuated by the leading or free end 38 of the chain 20 as the chain slides down the metering channel 34.

Figure 8:
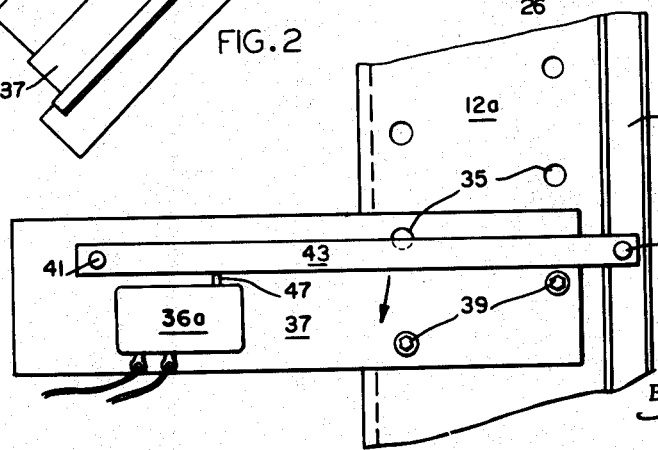
FIG. 8 is a plan view of the metering device according to the invention.

As shown in FIG. 8, frame part 12a, on which is secured metering channel 34, is provided with a series of pairs of locating holes 35. A plate 37 is transversely secured by means of bolts 39 which may be passed through any preselected pair of holes, depending on the length of chain to be separated. Pivoted at 41 to plate 37 is a lever 43 provided with a pin 45 arranged in the path of chain 20. As the chain slides down the metering channel 34, its leading end strikes pin 45, thereby swinging lever 43 in the direction shown by the arrow. Lever 43 depresses pin 47 of switch 36 thereby closing the circuit controlled by this switch.

Pin 45 is slidably held in a hole extending across lever 43. A spring 146 between the lower surface of lever 43 and an annular projection 145 on pin 45 urges pin 45 downwards into metering channel 34 at all times.

A delayed release relay 147 in the circuit of ram switch 74, see FIG. 7, when energized, pulls pin 45 upwards out of metering channel 34. Thus as long as relay 147 stays energized, pin 45 does not obstruct metering channel 34 and the sprocket chain travels freely into a suitably placed receptacle.

Located vertically in a recess in the guide plate 30 is a chain positioner 40 which is moved vertically downward by the horizontally forward action of cam 42 and ram 44, both of which are moved forward by the stroke of a double-acting air cylinder 46 controlled by a four-way air valve 48 actuated by a solenoid 50. This is a standard unit as used on spot welders. Rigidly attached to the ram 44 in a horizontal position and in axial alignment with the punch guide block guide holes 52 are two punches 54 the axial spacing of which corresponds to that of a pair of roller chain connecting pins 56. A single punch can be used in place of the two punches 54 and in this case only one connecting pin need be removed.

Affixed horizotally to the top surface of cam 42 is another cam 58 which in its forward movement actuates lever 60 operating air valve 62 to provide an air blast through ports 64, 64' through suitable delivery lines 77, 77' to blow out the extruded pins and disconnected links from the roller chain. The waste links drop through a vertical opening 66 in guide block 28 and are collected in tray 68. The extruded pins are ejected through openings 70 in guide plate 30 and support block 72 and also fall into tray 68.

As shown in FIG. 5, guide block 28, punch guide 32, guide plate 30 and block 72 are secured to frame part 12c by screws such as 75.

Pivotally attached to guide channel 26 in a horizontal plane is sensing cam 76 which when moved vertically actuates an electrical switch 78 to control the motor 14.

In the preferred embodiment of this invention, the motor 14 is actuated by a manual start switch 132 and the roller chain 20 is delivered from the stock roll 22 over the driven sprocket 18 and through the guide channel 26 and down the metering channel 34. When the end link 38 of the chain strikes the switch 36, it stops motor 14 and simultaneously energizes solenoid 50 actuating air valve 48.

Air is supplied through line 88 to cylinder 46 producing forward motion of piston 90 and ram 44 with its attached cams 42 and 58 and punches 54. As cam 42 moves forward it causes vertical movement downward of the chain positioner 40 which engages the link to be disconnected and secures the link in axial alignment with punches 54. Further forward motion of ram 44 delivers the punches 54 to the heads of the link connecting pins 56 punching them out of the chain.

Simultaneously the cam 58 lifts lever 60 actuating air valve 62 providing an air blast through ports 64 to blow the extruded pins out of the openings 70. At the end of the ram stroke, the extreme end 92 of cam 42 operates electrical switch 74 which reverses the action of cylinder 46 withdrawing the ram 44 and punches 54 allowing the unpinned connecting links to fall freely through opening 66. The separated length of chain may then be removed from the metering channel 34 by the operator at one or more of several semi-circular slots 94 located along metering channel 34.

It will be apparent that my apparatus can also readily be used to automatically and continuously cut and accumulate predetermined lengths of sprocket chain or to cut one length at a time, each time a cut length is removed. If the apparatus is to be used to accumulate a stock pile of cut chain then the switch 36 can be so located that once the separated length of chain is released, the chain slides down channel 34 into a storage bin thereby automatically allowing the cycle to repeat itself.

If the stock roll fails to unwind, excessive tension develops which causes clutch 16 to slip preventing chain breakage. When an obstruction prevents passage of the chain 20 through guide channel 26, the chain doubles upon itself causing sensing cam 76 to rise, thereby actuating electrical switch 78 stopping the motor 14. If the stock roll 22 is empty, no more roller chain 20 will pass through guide channel 26, the sensing cam 76 will then drop thereby again actuating electrical switch 78 in the opposite direction stopping the motor 14.

Various lengths of chain can be metered by locating electrical switch 36 at suitable positions long the frame 12 adjacent to channel 34.

In this arrangement the chain 20 is measured from the forward end giving a more accurate length measurement. Sprocket 18 may likewise be used as a metering device but in some cases may be less accurate than by locating switch 36 on channel 34.

Referring to FIG. 7, the electrical circuitry may be described as follows:

Power supply lines 98, 100 and 102 provide electrical energy through suitable contacts 114 of relay 104.

When the starting switch 132 is depressed manually, closing contacts 134 and 136 and opening contacts 133 and 135 the relay 104 is energized thus closing contacts 114, 116 and 118 opening contact 150 and starting the motor 14, the contacts 138 remaining closed. Since switch 132 is spring loaded upon releasing it, contacts 134 and 136 will open but motor 14 continues running even though the pressure on switch 132 is released, because relay 104 is locked in. This is accomplished since the current from line 100 flows past switch 74, past switch 137 through contacts 138, since it is still in closed position, through contacts 122, through switch 36, back to contacts 116 and back to line 98 completing the circuit.

Switch 137, in conjunction with switch 36, through closed contact 116 forms the manual stopping circuit. Switch 137 is also a spring loaded switch that will cause contacts 138 to close upon releasing it.

To manually stop motor 14 switch 137 is depressed opening contacts 138, since starting switch is not depressed and contacts 138 are open, no current can flow through 138 to send current to relay 104. Since no current flows through 116 relay 104 drops out of the circuit opening contacts 114 stopping the motor 14.

When starting switch 132 is depressed, as originally outlined, closing contacts 134 relay 112 is energized by the closing of contact 136 that is current flowing from line 100, through contacts 136 past relay 112 to line 98 closing the circuit. Since relay 112 is energized contacts 130 are closed energizing relay 110 by sending current from line 100 through contacts 130 past relay 110 through contacts 118, since relay 104 is locked in, keeping contacts 118 closed, back to line 98 completing the circuit, thus closing contacts 128 and opening contact 126.

Contact 128 holds relay 110 in by current flowing from line 100, through contact 128, past relay 110, through contact 118 and back to line 98 and holds relay 108 out of the circuit since relay 110 holds contacts 126 open preventing action of the ram 90 while the chain 20 is in motion.

Releasing the manual switch 132 opening contacts 136 drops relay 112 out of the circuit restoring contact 126. At this point the motor 14 is operating and the chain 20 is advancing.

When the end of the chain 38 opens switch 36, relay 104 drops out of the circuit due to the open contact 116, that is since current was flowing from line 100, past switch 74, through contacts 138, through contacts 122, past switch 36, through contacts 116, past relay 104 to line 98, keeping relay 104 in, and since there was no other way, by opening switch 36, the circuit is opened, no current flowing through the circuit. When switch 36 opens the said circuit, it closes another circuit. That is this opens contacts 118 and contacts 114 thus stopping the motor 14.

Switch 36 also energizes relay 108 by allowing current flowing from line 100, past switch 74 through contacts 138, through contacts 122 past switch 36 through closed contacts 126 to relay 108 back to line 98 closing the circuit. Since relay 108 is energized it will close contacts 124 thus energizing relay 106 by allowing the current to flow from line 100, through contacts 124 past relay 106, through contacts 118 and back to line 98 closing the circuit and closing contact 120. This action locks relay 108 in the circuit as long as the chain remains in contact with switch 36. This is so because current flows from line 100 past switch 74, through contacts 138 through contacts 122 past switch 36 through closed contacts 126, past relay 108 and back to line 98 completing the circuit.

When relay 106 is energized, contacts 120 are closed energizing solenoid 50 actuating the ram 90 through the action of the valve 48. Ram 90 closes switch 74 at the end of its stroke thus energizing relay 112 since current flowing from line 100 past switch 74, past relay 112 and back to line 98 closing the circuit thus closes contact 130 and energizes relay 110, opening contact 126 and closing contact 128. This action prevents flutter of valve 48 and also drops relay 108 out of the circuit through the open contact 126.

When relay 108 is out of the circuit, contact 124 opens, dropping relay 106, deenergizing solenoid 50 which reverses the action of the valve 48 and cylinder 50 thus withdrawing ram 90 to its starting position and resetting switch 74.

The circuit is now restored for recycling.

When switch 78 is actuated by malfunctioning of the chain or by the termination of the supply of sprocket chain relay 146 is energized by current flowing from line 100, past switch 78, past relay 146 and back to line 98 closing the circuit. This action opens contact 122 breaking the contact through contact 116 and switches 36 and 137, opening relay 104 and consequently stopping the motor 14. Manual actuation of switch 137 by the operator produces the same result.

FIG. 9 illustrates a circuit which permits automatic operation of the machine. A relay 152 controls the start switch 132. Relay 152 is inserted between supply lines 98 and 100 and will close start switch 132 only if three contacts 148, 150 and 154 are simultaneously closed. Contacts 150 and 154 are both normally closed. Contact 150 opens upon operation of relay 104, i.e., as soon as motor 14 starts rotating and closes when motor 14 stops rotating in response to the operation of detector switch 36. As soon as detector switch 36 is operated, it opens contact 154 which contact 154 now takes over the function of contact 150 to hold start switch 132 open until ram switch 74 operates and relay 147 withdraws pin 45 from metering channel 34, thereby opening contact 148 and closing contact 154. Contact 148 stays open until delayed action relay 147 is released, i.e., until the severed length of sprocket chain has left metering channel 34. Closing of contact 148 automatically initiates another cycle of the machine since at this time both contacts 150 and 154 are closed.

The invention hereinabove described may therefore be varied in construction within the scope of the claims for the particular device selected to illustrate the invention is but one of many possible embodiments of the same. The invention therefore is not to be restricted to the precise details of the structure shown and described.

What is claimed is:

1. A chain separating apparatus comprising a source of supply of sprocket chain consisting of links formed by side plates and cross pins, a chain feeding sprocket, a drive for rotating said sprocket to feed the leading end of said chain along a predetermined and at least partially downwardly inclined measuring path, a detector actuated by the leading end of said chain, a link locator controlled by the actuation of said detector, and cross pin ejectors coacting with said locator and controlled by said detector to displace pins from the chain links to be separated each time said detector measures off the desired length of sprocket chain, and means for actuating said link locator and said cross pin ejectors.

2. A chain separating apparatus comprising a source of supply of sprocket chain, a chain feeding sprocket, a drive for rotating said sprocket to feed the leading end of said chain along a predetermined and at least partially downwardly inclined measuring path, a slip clutch interposed between said drive and said sprocket to allow said sprocket to stand still whenever the resistance of said sprocket to turning by said drive exceeds a predetermined amount, a detector located near the end of the inclined path and actuated by the leading end of said chain, a link locator controlled by the actuation of said detector, and chain pin ejectors coacting with said locator and controlled by said detector to displace pins from the chain links to be separated each time said detector measures off the desired length of sprocket chain.

3. A chain separating apparatus comprising a source of supply of sprocket chain consisting of links formed by side plates and cross pins, a chain feeding sprocket, a drive for rotating said sprocket to feed the leading end of said chain along a predetermined measuring passage which extends at least partially downwardly for receiving the sprocket chain, a detector actuated by the leading end of said chain, a link locator controlled by the actuation of said detector, cross pin ejectors coacting with said locator and controlled by said detector to displace pins from the chain links to be separated each time said chain feeding sprocket has fed the desired length of sprocket chain, a second detector, positioned above the predetermined path of said chain in between said locator station and said sprocket and adapted to be actuated each time said sprocket chain becomes deflected away from its normal path of travel by an obstruction, and means connecting said second detector with said drive to incapacitate the same whenever said second detector is actuated.

4. Apparatus for separating predetermined lengths of chain from a reel of sprocket chain comprising, means for feeding a predetermined length of chain from said reel, a link locator positioned adjacent the path of travel of said chain, said link locator being adapted to directly engage and temporarily retain a predetermined link, a pair of pin ejecting plungers for ejecting the pins from a link that has been engaged by said locator, and means for causing a new length of chain to be fed after a link has been separated.

5. Apparatus for separating predetermined lengths of chain from a reel of sprocket chain comprising, means for feeding a predetermined length of chain from said reel, a link locator said link locator being adapted to directly engage and temporarily retain a predetermined link positioned adjacent the path of travel of said chain, a pair of pin ejecting plungers for ejecting the pins from a link that has been located by said locator, an air jet positioned adjacent said pin ejecting plungers to direct a blast of air upon said pins and located links when said pin ejector is actuated to blow away the separated links and the pins after they have been separated from the sprocket chain, and means for causing a new length of chain to be fed after a link has been separated.

6. Apparatus for separating predetermined lengths of chain from a reel of sprocket chain comprising, a sprocket for feeding chain from a reel, measuring means dividing the chain fed by said sprocket into predetermined lengths, a link locator said link locator being adapted to directly engage and temporarily retain a predetermined link, and a link separator actuated by said measuring means each time said sprocket has fed a predetermined amount of chain from said reel, said link separator having means for actuating said link locator prior to the separation of said link.

7. Apparatus for separating predetermined lengths of chain from a reel of sprocket chain comprising, a sprocket for feeding chain from a reel, drive means for said sprocket, means controlling the amount of chain fed by said sprocket, a link locator said link locator being adapted to directly engage and temporarily retain a predetermined link, a link separator actuated by said control each time said sprocket has fed a predetermined amount of chain from said reel, said link separator having means for actuating said link locator prior to the separation of said link, and a blower for exerting a blast of air on the link to be separated during actuation of said link separator to effect a removal of the separated link away from the chain.

8. Apparatus for separating predetermined lengths of chain from a reel of sprocket chain comprising, a sprocket for feeding chain from a reel, drive means for said sprocket means controlling the amount of chain fed by said sprocket, a link locator said link locator being adapted to directly engage and temporarily retain a predetermined link, a link separator actuated by said control each time said sprocket has fed a predetermined amount of chain from said reel, said link separator having means for actuating said link locator prior to the separation of said link, means for actuating said link locator and said separator, a blower for exerting a blast of air on the link to be separated during actuation of said link separator to effect a removal of the separated link away from the chain, a detector positioned above said chain adjacent said sprocket to be actuated whenever the sprocket chain is deflected from its normal path of travel by an obstruction, and an incapacitating device actuated by said detector for stopping the feed of sprocket chain each time said detector is actuated by said chain whenever an obstruction is encountered.

9. A chain separating apparatus comprising a source of supply of sprocket chain, a chain feeding sprocket, a detector for measuring a predetermined length of sprocket chain from the leading end of the chain fed by said sprocket, an inclined passage for receiving said sprocket chain, said detector being located along said inclined passage and having means projecting thereinto for abutting said leading end and a link separator actuated by said detector each time said sprocket has fed a predetermined amount of chain from said reel.

10. A chain separating apparatus comprising a source of supply of sprocket chain, a chain feeding sprocket, a passage containing said sprocket chain, a detector measuring off a predetermined length of sprocket chain from the leading end, a link locator said link locator being adapted to directly engage and temporarily retain a link at the lagging end of the predetermined length of sprocket chain and a link separator actuated by said detector each time said sprocket has fed a predetermined amount of chain from said reel.

11. A chain separating apparatus comprising a source of supply of sprocket chain, a chain feeding sprocket, drive means for said sprocket, an at least partially downwardly inclined passage for receiving said sprocket chain, a detector measuring off a predetermined length of sprocket chain from the leading end, a link locator setting up and holding a link from said predetermined length of chain operated by said detector, a link separator operated by said detector said detector being located along said inclined passage and having means projecting thereinto for abutting said leading end and means for actuating said link locator and said link separator.

12. A chain separating apparatus comprising a source of supply of sprocket chain, a chain feeding sprocket, means for driving said sprocket, a detector for measuring a predetermined length of sprocket chain from the leading end of the chain fed by said sprocket, an at least partially downwardly inclined measuring passage adapted to slidingly support said chain and supporting said detector, a link locator setting up and holding a link from said predetermined length of chain operated by said detector, a sprocket pin ejector plunger coacting with said locator and operated by said detector to displace pins from the sprocket links, means for actuating said locator and said ejector plunger and an air jet positioned adjacent said pin ejector to direct a blast of air upon said pins and links to blow away the separated links and pins after they have been separated from the sprocket chain said air jet operated by said detector.

13. A chain separating apparatus comprising a source of supply of sprocket chain, a chain feeding sprocket, a detector for measuring a predetermined length of chain fed by said sprocket, a link locator, a pin ejector member and an air jet in operating sequence with said locator, said pin ejector and air jet being regulated and actuated by a cam plunger said cam plunger being energized by a pneumatic system controlled by said detector.

14. A chain separating apparatus comprising a source of supply of sprocket chain, a chain feeding sprocket, a measuring passage which extends at least partially downwardly for receiving the sprocket chain, a detector for measuring a predetermined length of chain from the leading end of the sprocket chain fed by said sprocket said detector being located along said inclined passage and having means projecting thereinto for abutting said leading end, a safety device to stop said feeding sprocket each time an excessive quantity of chain is fed and a link separator actuated by said detector each time said sprocket has fed a predetermined amount of chain from said reel.

15. A chain separating apparatus comprising a source of supply of sprocket chain, a chain feeding sprocket, a detector for measuring variable predetermined length of sprocket chain fed by said feeding sprocket, a link locator and a chain pin ejector coacting with said locator to displace pins from the chain link to be separated said link locator being adapted to directly engage and temporarily retain a predetermined link.

16. A chain separating apparatus comprising a source of supply of sprocket chain, a chain feeding sprocket, a measuring passage which extends at least partially downwardly for receiving the sprocket chain, a detector for measuring a predetermined length of sprocket chain fed by said feeding sprocket said detector being located along said inclined passage and having means projecting thereinto for abutting said leading end, a link locator, a chain pin ejector coacting with said locator to displace pins from the sprocket chain to be separated, another detector actuated by and coacting with said pin ejector to return said pin ejector releasing said predetermined length of chain.

17. A chain separating apparatus comprising a source of supply of sprocket chain, a chain feeding sprocket, a detector for measuring a predetermined length of sprocket chain fed by said feeding sprocket, a link locator, a chain pin ejector coacting with said locator to displace pins from the sprocket chain to be separated, another detector actuated by and coacting with said pin ejector to return said pin ejector releasing said predetermined length of chain, and means reactivating the machine to measure another predetermined length of sprocket chain subsequently to the release of the preceding predetermined length of sprocket chain.

18. A chain separating apparatus comprising a source of supply of sprocket chain, a feeding sprocket for feeding sprocket chain from said source of supply, a detector detecting a predetermined length of sprocket chain, an inclined passage containing said predetermined length of sprocket chain supporting said detector said detector being located along said inclined passage and having means projecting thereinto for abutting said leading end and a link separator actuated by said detector each time said sprocket has fed a predetermined amount of chain from said reel.

19. A chain separating apparatus comprising a source of supply of sprocket chain, a chain feeding sprocket, a detector for measuring a predetermined length of sprocket chain from the leading end of the chain fed by said sprocket, an at least partially downwardly inclined measuring passage adapted to slidingly support said chain and supporting said detector, a separating station which includes a link locator setting up and holding a link from said predetermined length of chain operated by said detector, a chain pin ejector plunger coacting with said locator and operated by said detector to displace pins from the chain links, an air jet positioned adjacent said pin ejector to direct a blast of air upon said pins and links to blow away the separated links and pins after they have been separated from the sprocket chain said air jet operated by said detector, and a guide block for the chain, having a vertical chute which extends therethrough for allowing said separated links to fall downwardly therethrough.

20. A chain separating apparatus comprising a chain feeding sprocket, a source of supply of sprocket chain, a drive for rotating said sprocket to feed the leading end of said sprocket chain along a predetermined at least partially downwardly inclined measuring passage, a slip clutch interposed between said drive and said sprocket, a detector located at the end of said passage and responsive to the leading end of said sprocket chain to detect predetermined lengths of sprocket chain, a link locator for positioning a link, a chain pin ejector coacting with said locator to eject chain pins, an air jet coacting with said pin ejector and said locator to blow away the separated links and pins after they have been separated from the sprocket chain, a second detector positioned above the predetermined passage of said sprocket chain in between said link locator and said sprocket and adapted to be actuated each time said sprocket chain becomes deflected away from its normal path of travel by an obstruction, said second detector detecting the end of the source of supply of sprocket chain, and a release to permit free travel of the said predetermined length of sprocket chain after the link separator separates said chain recycling the chain separating apparatus.

21. A chain separating apparatus comprising, a source of supply of sprocket chain consisting of links formed by side plates and cross pins, a chain feeding sprocket provided with toothed elements directly engaging with the cross pins, drive means for said procket, a measuring passage which extends at least partially downwardly for receiving the sprocket chain, a detector at the end of said passage for measuring a predetermined length of chain fed by said sprocket and actuated by an end link of the chain, a link locator, pin ejectors coacting with said locator to displace the cross pins from the links, and means controlled by said detector for actuating said link locator and said pin ejectors each time said detector has measured a predetermined length of chain.

References Cited in the file of this patent

UNITED STATES PATENTS

| | | |
|---|---|---|
| 1,174,349 | Reynolds | Mar. 7, 1916 |
| 1,206,086 | Benjamin et al. | Nov. 28, 1916 |
| 2,247,766 | Boerger | July 1, 1941 |
| 2,433,444 | Eichinger | Dec. 30, 1947 |
| 2,700,870 | Green | Feb. 1, 1955 |
| 2,743,925 | Elliott et al. | May 1, 1956 |